United States Patent [19]
Hwang et al.

[11] Patent Number: 5,804,950
[45] Date of Patent: Sep. 8, 1998

[54] INPUT CURRENT MODULATION FOR POWER FACTOR CORRECTION

[75] Inventors: Jeffrey H. Hwang, Satatoga, Calif.; Wing-Hung Ki, Kowloon, Hong Kong

[73] Assignee: Micro Linear Corporation, San Jose, Calif.

[21] Appl. No.: 667,117

[22] Filed: Jun. 20, 1996

[51] Int. Cl.⁶ .............................. G05F 1/70; G05F 1/656; H02M 3/155
[52] U.S. Cl. ........................ 323/222; 323/282; 363/21; 363/89
[58] Field of Search .................... 323/207, 222, 323/284, 282, 275, 286; 363/21, 59, 89, 17

[56] References Cited

U.S. PATENT DOCUMENTS

| | | | |
|---|---|---|---|
| 3,294,981 | 12/1966 | Bose | 307/88.5 |
| 3,603,809 | 9/1971 | Uchiyama | 307/228 |
| 3,660,753 | 5/1972 | Judd et al. | 323/22 T |
| 3,883,756 | 5/1975 | Dragon | 307/265 |
| 4,311,954 | 1/1982 | Capel | 323/222 |
| 4,392,103 | 7/1983 | O'Sullivan et al. | 323/222 |
| 4,407,588 | 10/1983 | Arichi et al. | 368/118 |
| 4,437,146 | 3/1984 | Carpenter | 363/21 |
| 4,456,872 | 6/1984 | Froeschle | 323/286 |
| 4,529,927 | 7/1985 | O'Sullivan et al. | 323/222 |
| 4,651,231 | 3/1987 | Douglas, Jr. | 358/342 |
| 4,672,303 | 6/1987 | Newton | 323/285 |
| 4,672,518 | 6/1987 | Murdock | 363/21 |
| 4,677,366 | 6/1987 | Wilkinson et al. | 323/222 |
| 4,691,159 | 9/1987 | Ahrens et al. | 323/222 |
| 4,731,574 | 3/1988 | Melbert | 323/275 |
| 4,736,151 | 4/1988 | Dishner | 323/224 |
| 4,761,725 | 8/1988 | Henze | 363/46 |
| 4,841,220 | 6/1989 | Tabisz et al. | 323/282 |
| 4,845,420 | 7/1989 | Oshizawa et al. | 323/222 |
| 4,920,309 | 4/1990 | Szepesi | 323/269 |
| 4,929,882 | 5/1990 | Szepesi | 323/222 |

(List continued on next page.)

FOREIGN PATENT DOCUMENTS 60-22490  2/1985  Japan ............................ 5/41

OTHER PUBLICATIONS

"11. Variable Frequency Converters", K. Kit Sum, pp. 96–97, 134–135, 1993.

"3.3V/5V/Adjustable Output, Step–Up, DC–DC Converters", Maxim Integrated Products, pp. 1–8, 1993.

"Small–Signal High–Frequency Analysis Of The Free–Running Current–Mode–Controlled Converter", Richard Redl, pp. 897–906, IEEE, 1991.

"Low Voltage–Input, 3V/3.3V/5V/Adjustable–Output, Step–Up DC–DC Converters", Maxim Integrated Products, pp. 4–189 to 4–191 (no date).

(List continued on next page.)

*Primary Examiner*—Peter S. Wong
*Assistant Examiner*—Rajnikani B. Patel
*Attorney, Agent, or Firm*—Haverstock & Owens LLP

[57] ABSTRACT

A nonlinear carrier controlled power factor correction circuit operates in the continuous and discontinuous conduction modes and provides unity power factor at the input of a power supply by only sensing the output voltage and the current flowing through a diode of a rectifier circuit. The power factor correction circuit monitors a level of current flowing through the diode and generates an integrated voltage signal representative of the level of current flowing through the diode. The integrated voltage signal is compared to a periodic, carrier waveform signal generated using a feedback signal corresponding to a level of an output voltage delivered to a load. A difference between the feedback signal and a reference signal determines the waveshape and characteristics of the carrier waveform. Preferably, leading edge modulation is used to control the duty cycle of a switch within the rectifier circuit. The switch is turned on when the integrated voltage signal reaches a level greater than the value of the carrier waveform. The switch is turned off at the leading edge of the clock reference signal. The duty cycle of the switch will vary as the level of the output voltage varies in reference to the reference signal and as the level of current through the diode varies.

26 Claims, 7 Drawing Sheets

U.S. PATENT DOCUMENTS

| | | | |
|---|---|---|---|
| 4,940,929 | 7/1990 | Williams | 323/222 |
| 4,941,080 | 7/1990 | Sieborger | 363/127 |
| 4,947,309 | 8/1990 | Jonsson | 363/17 |
| 4,975,823 | 12/1990 | Rilly et al. | 363/56 |
| 5,028,861 | 7/1991 | Pace et al. | 323/222 |
| 5,034,873 | 7/1991 | Feldtkeller | 363/21 |
| 5,138,249 | 8/1992 | Capel | 323/283 |
| 5,146,399 | 9/1992 | Gucyski | 363/89 |
| 5,278,490 | 1/1994 | Smedley | 323/284 |
| 5,359,281 | 10/1994 | Barrow et al. | 323/284 |
| 5,412,308 | 5/1995 | Brown | 323/267 |
| 5,414,341 | 5/1995 | Brown | 323/268 |
| 5,430,364 | 7/1995 | Gibson | 323/207 |
| 5,434,767 | 7/1995 | Batarseh et al. | 363/16 |
| 5,440,473 | 8/1995 | Ishii et al. | 363/21 |
| 5,450,000 | 9/1995 | Olsen | 323/222 |
| 5,457,621 | 10/1995 | Munday et al. | 363/56 |
| 5,457,622 | 10/1995 | Arakawa | 363/59 |
| 5,461,302 | 10/1995 | Garcia et al. | 323/222 |
| 5,479,089 | 12/1995 | Lee | 323/283 |
| 5,481,178 | 1/1996 | Wilcox et al. | 323/287 |
| 5,485,361 | 1/1996 | Sokal | 363/89 |
| 5,491,445 | 2/1996 | Moller et al. | 327/540 |
| 5,502,370 | 3/1996 | Hall et al. | 323/284 |
| 5,517,399 | 5/1996 | Yamauchi et al. | 363/89 |
| 5,532,577 | 7/1996 | Doluca | 323/282 |
| 5,552,695 | 9/1996 | Schwartz | 323/271 |
| 5,565,761 | 10/1996 | Hwang | 323/222 |
| 5,568,041 | 10/1996 | Hesterman | 323/207 |
| 5,592,071 | 1/1997 | Brown | 323/282 |
| 5,592,128 | 1/1997 | Hwang | 331/61 |
| 5,610,502 | 3/1997 | Tallant, II et al. | 323/222 |
| 5,617,013 | 4/1997 | Cozzi | 323/222 |
| 5,617,306 | 4/1997 | Lai et al. | 363/17 |
| 5,627,460 | 5/1997 | Bazinet et al. | 323/288 |

OTHER PUBLICATIONS

"LT1073 Micropower DC–DC Converter Adjustable and Fixed 5V, 12V", Linear Technology, pp. 4–174 to 4–189, 4–192, (no date).

"System–Engineered Portable Power Supplies Marry Improved Efficiency And Lower Cost", Bruce D. Moore, Maxim Integrated Products (no date).

"ML 4823 High Frequency Power Supply Controller," Micro Linear Corporation, Dec. 1994.

"CD 54/74 HC 4046A Technical Data," RCA, (no date).

"ML4863 High Efficiency Battery Pack Converter (Preliminary)", Micro Linear Corporation, Jun. 1994.

"ML4880 Portable PC/PCMCIA Power Controller (Preliminary)", Micro Linear Corporation, Oct. 1995.

"Nonlinear–Carrier Control for High Power Factor Boost Rectifiers Based on Flyback, Cuk or Sepic Converters", Applied Power Electronics Conf., pp. 814–820, 1996.

"Nonlinear–Carrier Control for High Power Factor Boost Rectifiers", D. Maksimovic, Y. Jang, R. Erikson, Applied Power Electronics Conf., pp. 641–651, 1995.

"ML4863 High Efficiency Flyback Controller", Micro Linear Corporation, Feb. 1995.

"ML4863EVAL User's Guide High Efficiency Flyback Controller", Micro Linear Corporation, Feb. 1995.

"Off–Line And One–Cell IC Converters Up Efficiency", Frank Goodenough, Electronic Design, pp. 55–56, 58, 60, 62–64, Jun. 27, 1994.

"Designing with hysteretic current–mode control", Gedaly Levin and Kieran O'Malley, Cherry Semi–Conductor Corp., EDN, pp. 95–96, 98, 100–102, Apr. 28, 1994.

"Analysis of the Flyback Converter Operating in Current-–Mode Pulse–Frequency Modulation", Urs Mader and Kit Sum, High Frequency Power Conversion, Apr. 17, 1994.

"Step–Up/Step Down Converters Power Small Portable Systems", Bruce D. Moore, EDN, pp. 79–84, Feb. 3, 1994.

"ML4861 Low Voltage Boost Regulator", Micro Linear Corporation, Jun. 1993.

"ML4821 Power Factor Controller", Micro Linear Corporation, Jan. 1992.

"Application Note 16", Theory and Application of the ML4821 Average Current Mode PFC Controller", Micro Linear Corporation, Jan. 1992.

INPUT CURRENT MODULATION FOR POWER FACTOR CORRECTION

FIELD OF THE INVENTION

This invention relates to the field of switching mode power supplies. More particularly, the present invention relates to the field of switching mode power factor control circuits using a nonlinear carrier waveform signal to control the operation of a switch within the switching mode power supply.

BACKGROUND OF THE INVENTION

Figure 1:
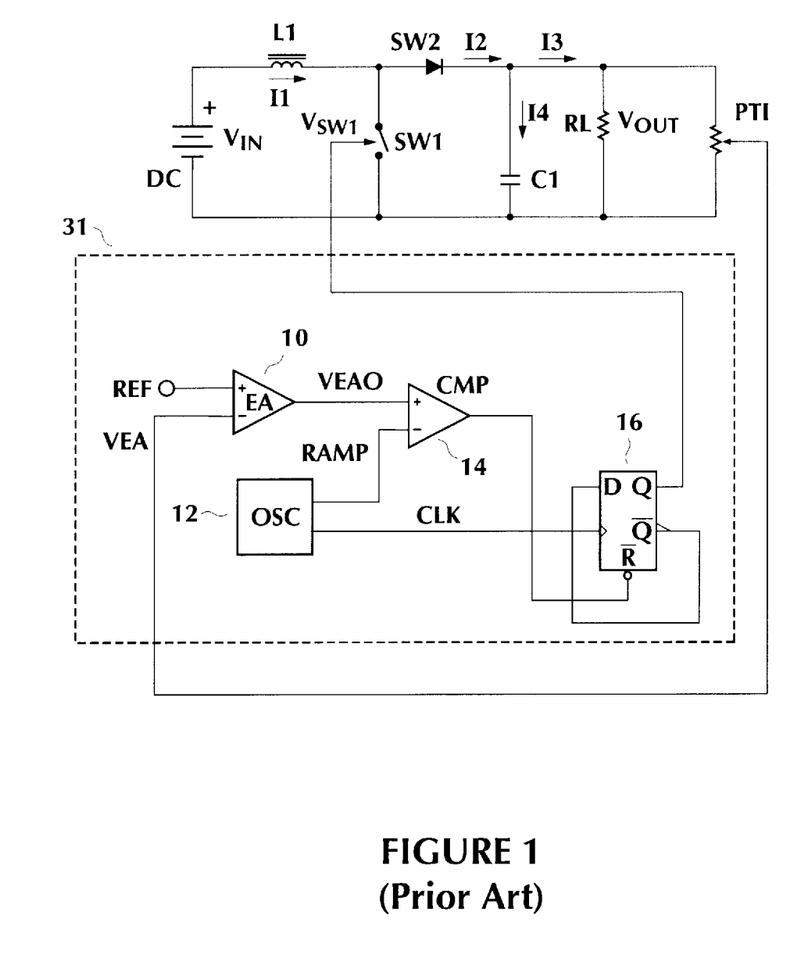
FIG. 1 illustrates a schematic diagram of a switching mode power converter of the prior art.

For typical switching mode power converters of the prior art, the output voltage is controlled by an electronic circuit which measures a level of the output voltage, compares that measured level to a predetermined desired level, and develops a response to that measurement elsewhere in the circuit in order to more accurately achieve the desired output voltage. A prior art switching mode power converter which uses a trailing edge modulation control scheme is illustrated in FIG. 1. The input voltage VIN is coupled to a first terminal of the inductor L1. A second terminal of the inductor L1 is coupled to a first terminal of a switch SW1 and to an anode of a diode SW2. A capacitor C1 is coupled between a cathode of the diode SW2 and a second terminal of a switch SW1. A load RL is coupled across the capacitor C1. A potentiometer PT1 is coupled across the load RL and provides a negative input to a voltage error amplifier 10. A reference voltage REF is coupled to a positive input of the error amplifier 10. The output VEAO of the voltage error amplifier 10 is coupled as the positive input of a pulse-width modulating comparator 14. The negative input of the modulating comparator 14 is coupled to receive the ramp output of an oscillator 12. The output of the modulating comparator 14 is coupled as the reset input R of a flip flop 16. The input D of the flip flop 16 is coupled to the inverted output $\overline{Q}$ of the flip flop 16. A clock input CLK of the flip flop 16 is coupled to the clock output of the oscillator 12. The output Q of the flip flop 16 is coupled to control the operation of the switch SW1.

The output voltage VOUT supplied to the load RL is formed by integrating the inductor current I1 in the capacitor C1. Pulse width modulation (PWM) is used to maintain a constant output voltage VOUT when the input voltage VIN varies over time. By modulating the width of voltage pulses that control the switch SW1, the output voltage VOUT can be maintained at a constant level. Energy from the input source VIN is stored in the inductor L1 when the switch SW1 is closed. When the switch SW1 is open, energy from the inductor L1 is transferred to the capacitor C1 and to the load RL. A predetermined fraction of the output voltage VOUT is formed by the potentiometer PT1. This voltage VEA is input into the negative terminal of the error amplifier 10 for comparison to the reference voltage REF. The comparison determines how close the actual output voltage VOUT is to the desired output voltage and is used to modulate the width of the pulses that control the switch SW1.

FIG. 1 illustrates a trailing edge pulse width modulation scheme for controlling the switch SW1. In trailing edge modulation, the switch SW1 turns on (closes) on the trailing edge of the clock signal. The leading edge of the clock signal may also be utilized to implement leading edge modulation. For a leading edge modulation control scheme, the inputs to the error amplifier 10 are be reversed: the voltage VEA from the potentiometer PT1 is coupled to the positive terminal of the voltage error amplifier 10 and the reference voltage REF is coupled to the negative terminal of the voltage error amplifier 10.

Figure 2:
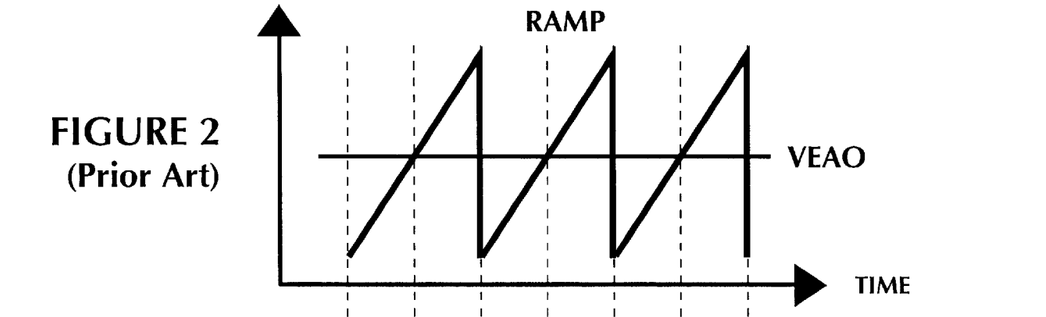
FIG. 2 illustrates a timing diagram of the voltage levels of the error amplifier output VEAO and the modulating ramp output of the oscillator of the switching mode power converter of FIG. 1.
Figure 3:
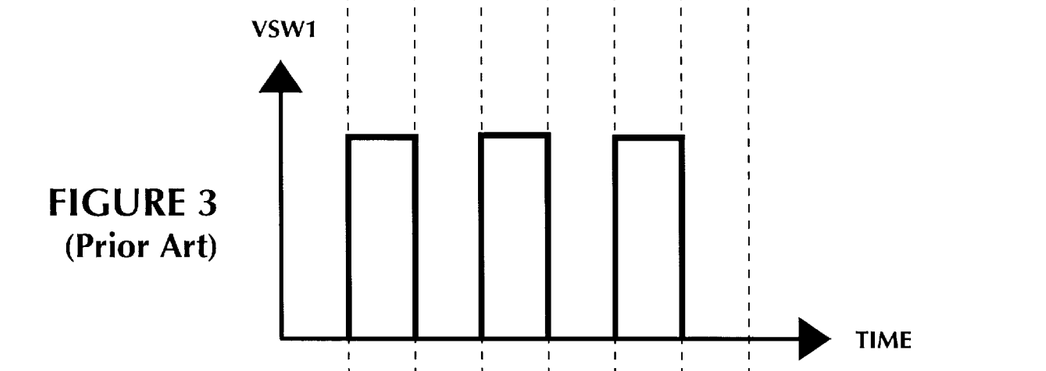
FIG. 3 illustrates a timing diagram of the control voltage VSW1 of the switching mode power converter of FIG. 1.
Figure 4:
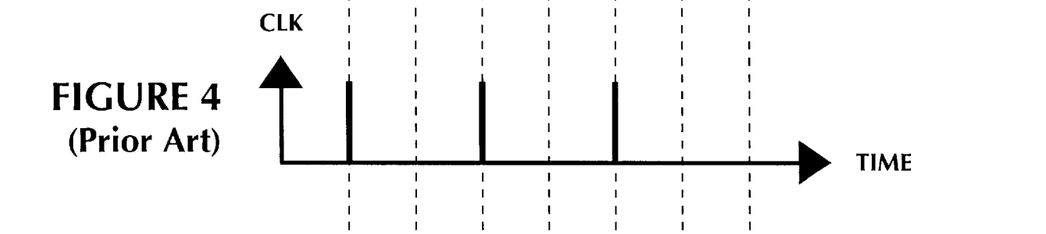
FIG. 4 illustrates a timing diagram of the clock output of the oscillator 12 of the switching mode power converter of FIG. 1.

FIGS. 2, 3 and 4 show corresponding voltage waveforms with respect to time of different voltage levels at different points within the switch control circuitry 31 of the trailing edge scheme, illustrated in FIG. 1. The time axis for the FIGS. 2, 3 and 4 has been drawn to correspond in all three figures. FIG. 2 illustrates the voltage levels with respect to time of the error amplifier output VEAO and the modulating ramp output of the oscillator 12. FIG. 3 illustrates the voltage level of the control voltage VSW1 for the switch SW1 with respect to time. The switch SW1 is "on" or closed when the control voltage VSW1 is at a high voltage level. The switch SW1 is "off" or open when the control voltage VSW1 is at a low voltage level. FIG. 4 illustrates the clock impulses with respect to time of the clock output of the oscillator 12.

The switch SW1 will turn on after the trailing edge of the system clock. Once the switch SW1 is on, the modulating comparator 14 then compares the error amplifier output voltage VEAO and the modulating ramp. When the modulating ramp reaches the error amplifier output voltage, the output of the modulating comparator 14 will fall to a logical low voltage level. Because of the inverter coupled to the input, the input R of the flip flop 16 will then rise to a logical high voltage level thereby resetting the output Q of the flip flop 16 to a logical low voltage level and turning the switch SW1 off. When the switch SW1 is on, the inductor current IL will ramp up. The effective duty cycle of the trailing edge modulation is determined as a ratio of the on time of the switch to its off time. FIG. 1 illustrates a typical trailing edge control scheme using a single boost power converter stage. As the input voltage VIN varies over time, the duty cycle or time that the switch SW1 is on will vary in order to maintain a constant output voltage VOUT.

While the above-described circuit regulates the output voltage, it does not ensure that the input current follows the input voltage in time and amplitude proportionally. When a power converter such as in shown in FIG. 1 is coupled to receive a rectified line voltage, it can cause problems in a power distribution system, such as reducing the capacity of the distribution system, increasing harmonics and overheating substation transformers. Therefore, it is desirable that a power converter ensure that the input current follow the line voltage such that the power converter is substantially a resistive load to the power line. A power factor correction circuit ensures that the input current follows the line voltage in time and amplitude proportionally (i.e. the input voltage and current are maintained in phase relative to each other).

Figure 5:
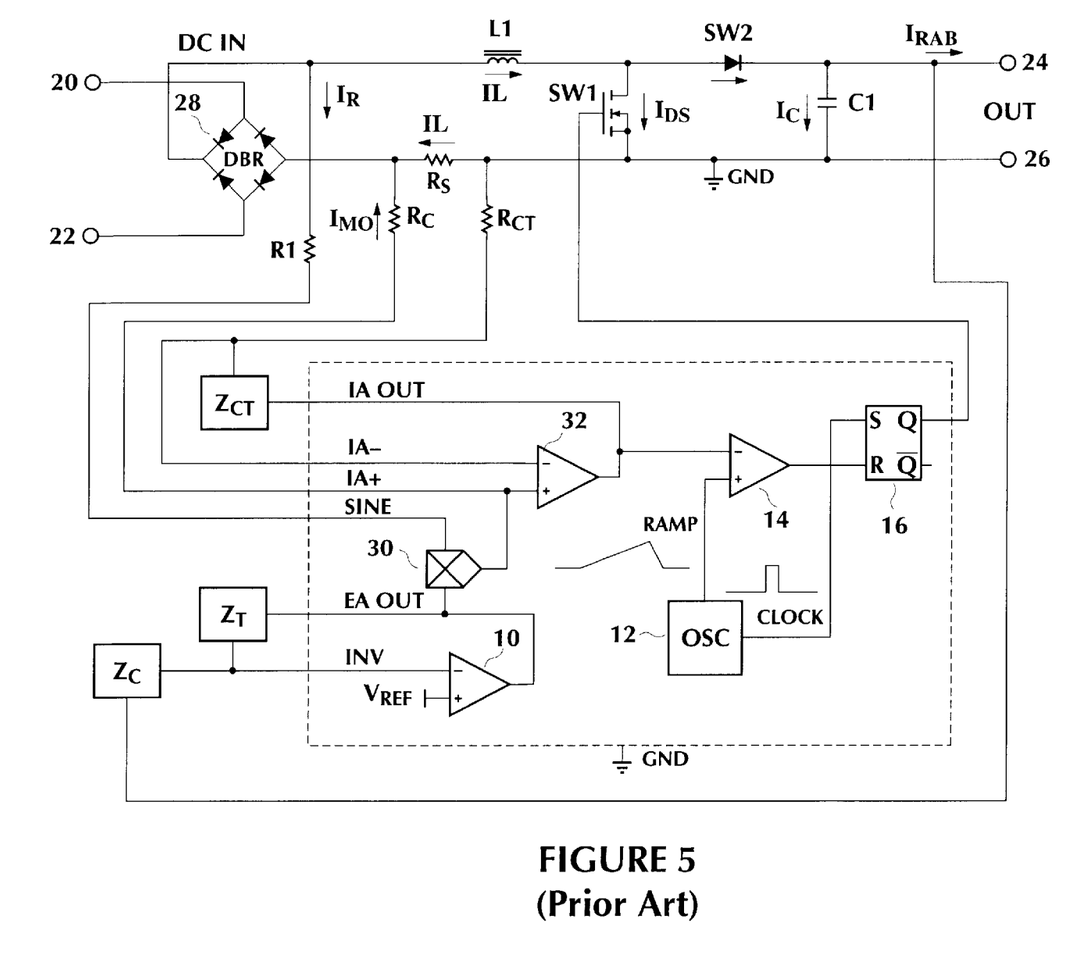
FIG. 5 illustrates a block diagram schematic of a boost rectifier of the prior art including a power factor controller circuit.

A circuit diagram of a power factor controller circuit is illustrated in FIG. 5. Elements that are identical to those of FIG. 1 use the same reference numerals. The line voltage is coupled to input terminals of a full wave bridge rectifier 18. A positive output terminal of the full wave bridge rectifier is coupled to provide the rectified input signal to a first terminal of an inductor L1 and to a first input terminal of a multiplier 20. A second terminal of the inductor L1 is coupled to a drain of an NMOS transistor SW1 and to an anode of a diode SW2. A cathode of the diode SW2 is coupled to a first terminal of a capacitor C1 and to a first terminal of a resistor R1. A second terminal of the capacitor C1 and a source of the transistor SW1 are coupled to the ground node. The voltage Vout across the capacitor C1 can be utilized to power a load coupled across the capacitor C1.

A second terminal of the resistor R1 is coupled to a first terminal of a resistor R2 and to a negative input to a voltage error amplifier 10. A second terminal of the resistor R2 is coupled to the ground node. A reference voltage Vref is coupled to a positive input to the amplifier 10. An output of the amplifier 10 is coupled to a second input terminal of the multiplier 20. An output of the multiplier 20 is coupled to a first terminal of a resistor Ra and to a positive input to a current error amplifier 22. A second terminal of the resistor Ra is coupled to a negative output terminal of the full-wave bridge rectifier and to a first terminal of a resistor Rs. A second terminal of the resistor Rs is coupled to a first terminal of a resistor Rb and to the ground node.

A second terminal of the resistor Rb is coupled to a negative input of the amplifier 22. An output of the amplifier 22 is coupled to a negative input of a modulating comparator 14. A ramp output of an oscillator 12 is coupled to a positive input of the comparator 14. An output of the comparator 14 is coupled to a reset input R of a flip-flop 16. A clock output of the oscillator 12 is coupled to a set input S of the flip-flop 16. An output Q of the flip-flop 16 is coupled to a gate of the transistor SW1.

The function of a power factor correction section is to ensure that the input current follows the input voltage in time and amplitude proportionally. Thus, the power converter will appear as a resistive load to the line. For a switching mode power factor correction stage, the input current is switched at a frequency sufficiently higher than the input line frequency (i.e., at least an order of magnitude higher) to ensure that the modulated input current follows the line voltage.

A reference signal that is proportional to the input full wave rectified voltage is applied to the multiplier 20. The other input of the multiplier 20 is the output of the voltage error amplifier 10. The multiplier 20 is usually of a current input type which enables the multiplier 20 to have greater ground noise immunity. When there is a current at its input, the terminal voltage of the multiplier 20 is a diode drop between 0.7V and 1V.

The output of the multiplier 20 is a current which is the product of the reference signal, the output of the voltage error amplifier 10 and a gain adjustor factor. This output current is applied to the resistor Ra. The voltage across the resistor Ra subtracts from the sensed voltage across the sense resistor Rs and is applied to the current error amplifier 22. Under closed loop control, the current error amplifier 22 will try to keep this voltage differential near the zero volt level. This forces the voltage produced by the return current flowing through the sense resistor Rs to be equal to the voltage across the resistor Ra.

The amplified current error signal output from the current error amplifier 22 is then applied to the negative input of the modulating comparator 14. The positive input of the modulating comparator 14 is coupled to receive the ramp signal output from the oscillator 12. Pulse width modulation is obtained when the amplified error signal that sets up the trip point modulates up and down.

A current control loop modulates the duty cycle of the switch SW1 in order to force the input current waveshape to follow the shape of the input voltage. The input voltage is a full wave rectified sinewave. The current control loop and the power delivery circuitry must have at least enough bandwidth to follow this full wave rectified waveform.

Thus, the above described power factor correction stage requires input (line) voltage sensing to obtain a sinusoidal reference signal, an analog multiplier to combine this reference signal with the output voltage error signal, and an error amplifier in the current feedback loop which extracts the difference between the input current and the reference signal to generate the control signal for modulating the input current.

In an article entitled "Nonlinear-Carrier Control For High Power Factor Boost Rectifiers," Dragan Maksimovic, Yungtaek Jang and Robert Erickson introduced a nonlinear-carrier controller for high power factor boost rectifiers. Dragan Maksimovic, Yungtaek Jang and Robert Erickson, "Nonlinear-Carrier Control For High Power Factor Boost Rectifiers," 1995 IEEE APEC Conference, pages 635–641. This power factor controller was intended preform power factor correction while eliminating some of the circuit elements described above in reference to FIG. 5. The controller proposed by Maksimovic et al. integrates the current through the switch and compares it with a parabolic carrier waveform in order to generate the duty cycle of the switch. This eliminates the input voltage sensing, the current error amplifier and the multiplier in the voltage feedback loop, which were all necessary in the power factor controller illustrated in FIG. 5.

Figure 6:
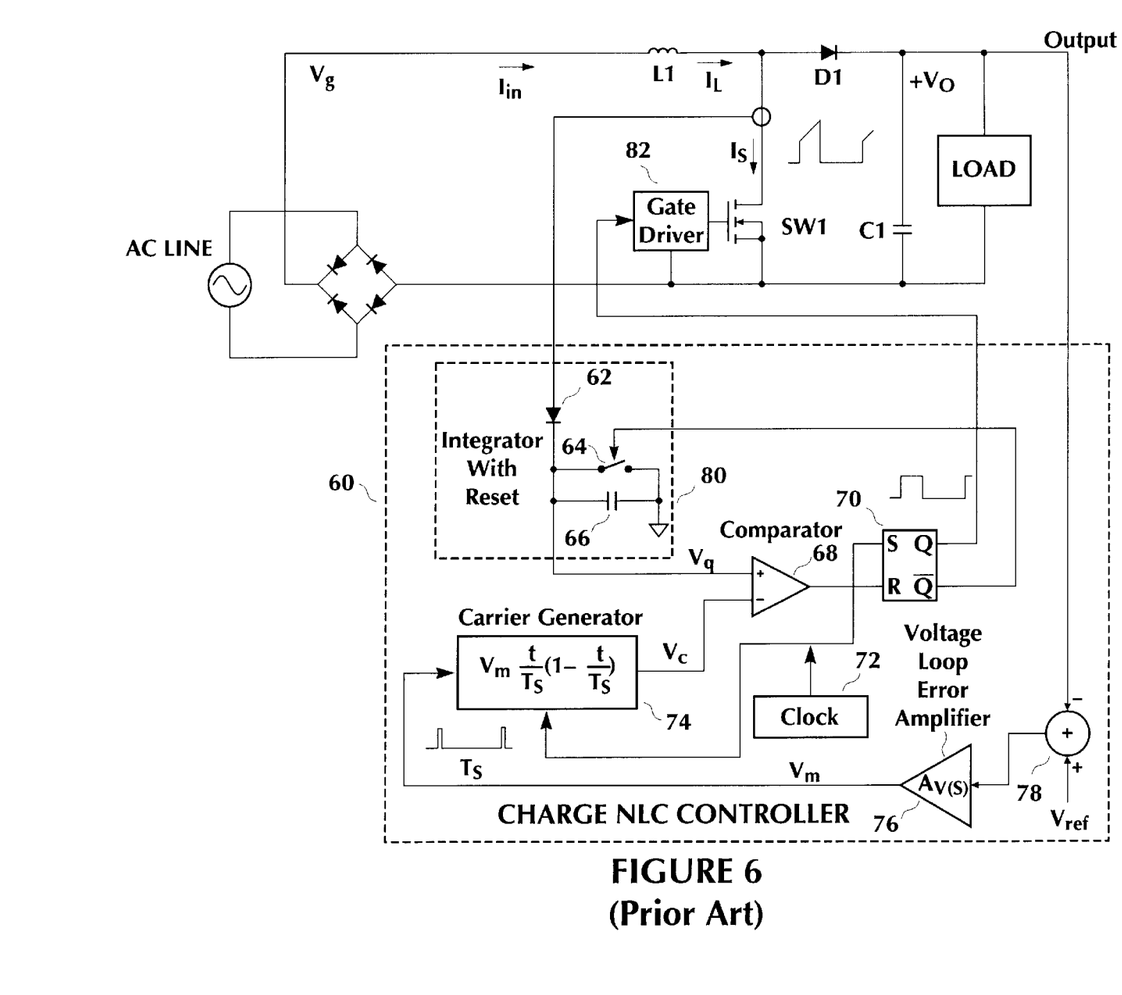
FIG. 6 illustrates a block diagram schematic of a boost rectifier of the prior art including a nonlinear carrier power factor controller circuit.

A block diagram schematic of a boost rectifier according to the teachings of Maksimovic et al. is illustrated in FIG. 6. The non-linear carrier controller 60 includes an integrator 80 for integrating the switch current Is and a carrier generator 74 for generating the carrier waveform Vc. An anode of a diode 62 is coupled to receive the switch current Is. A cathode of the diode 62 is coupled to a first terminal of a switch 64, to a first terminal of a capacitor 66 and to a positive input of a comparator 68, forming an output of the integrator 80 which provides the integrated signal Vq, representing the current flowing through the switch SW1. A second terminal of the switch 64 is coupled to a second terminal of the capacitor 66 and to ground.

A negative input of an adder circuit 78 is coupled to receive the output voltage Vo, representing the voltage delivered to the load. A positive input of the adder circuit 78 is coupled to receive a reference voltage Vref. A modulating output of the adder circuit 78 is coupled as an input to a voltage-loop error amplifier 76. An output Vm of the voltage-loop error amplifier 76 is coupled as an input to the carrier generator circuit 74. An output of the carrier generator circuit 74 provides the carrier waveform Vc and is coupled to a negative input of the comparator 68. An output of the comparator 68 is coupled to a reset input R of a flip-flop 70. An oscillator circuit 72 provides a clock signal which is coupled to the carrier generator circuit 74 and to a set input S of the flip-flop 70. An inverse output $\overline{Q}$ of the flip-flop 70 is coupled to control the switch 64. An output Q of the flip-flop 70 is coupled as an input to the gate driver circuit 82. Together the output Q of the flip-flop 70 and the gate driver circuit 82 control the operation of the switch SW1.

The integrated signal Vq is generated by the integrator 80 in response to the level of the current Is flowing through the switch SW1. The modulating output Vm of the voltage-loop error amplifier 76, representing the difference between the output voltage Vo and the reference voltage Vref, is input to the carrier generator 74 for generating the carrier waveform Vc. The comparator 68 compares the integrated signal Vq to the carrier waveform Vc. The output of the comparator 68 is at a logical low voltage level when the integrated signal Vq is less than the carrier waveform Vc. The output of the comparator 68 is at a logical high voltage level when the integrated signal Vq is greater than the carrier waveform Vc. The output of the comparator 68 is input to the flip-flop 70 and signals when the switch SW1 should be turned off. The oscillating clock signal generated by the oscillator circuit 72 signals when the switch SW1 should be turned on. In this manner, the duty cycle of the switch SW1 is controlled by the nonlinear carrier controller illustrated in FIG. 6.

The goal of a power factor controller is to ensure that the input current follows the input voltage. Maksimovic et al. started with the proposition that the converter appears as a resistive load to the AC input line, having a resistance value equal to an emulated resistance value Re. Therefore, the input current is equal to the input voltage Vin divided by the resistance Re, as demonstrated by the following equation:

$$Iin = \frac{Vin}{Re} = Il \qquad (1)$$

As also illustrated by equation (1), the input current Iin is equal to the current Il through the inductor. It is further true that the current Il is equal to the sum of the current Is through the switch SW1 and the current Id through the diode SW2, as illustrated by the following equation:

$$Il = Is + Id \qquad (2)$$

It can also be assumed that the input power of the rectifier circuit, represented by the input voltage Vin multiplied by the current Il through the inductor, is equal to the output power of the rectifier circuit, represented by the output voltage Vo multiplied by the current Id through the diode, if there are negligible power losses throughout the circuit. This relationship is illustrated in the following equation:

$$Vin\ Il = Vo\ Id \qquad (3)$$

In each cycle, the current Is through the switch SW1 is represented by the following equation:

$$Is = \frac{1}{Ts} \int_0^{dTs} Is(t)dt \qquad (4)$$

If the equations (1) and (3) are combined, the current Is can also be calculated as shown in the following equations:

$$Is = \frac{Vin}{Re} - Id \qquad (5)$$

$$Is = \frac{Vin}{Re} - \frac{Vin}{Vo} Il \qquad (6)$$

$$Is = \frac{Vin}{Re}\left(1 - \frac{Vin}{Vo}\right) \qquad (7)$$

$$Is = \frac{Vin}{Re}\left(\frac{Vo - Vin}{Vo}\right) \qquad (8)$$

$$Is = \frac{Vo}{Re} D(1-D);\ \text{If}\ Vin = Vo(1-D) \qquad (9)$$

If the boost converter operates in the continuous conduction mode, then the input voltage Vin is equal to the output voltage Vo multiplied by one minus the duty ratio D of the switch SW1. By then comparing the values derived using the equations (4) and (9), pulse width modulation can be used to control the duty cycle of the switch SW1.

Figures 7, 7A, 7B, 7C, 7D:
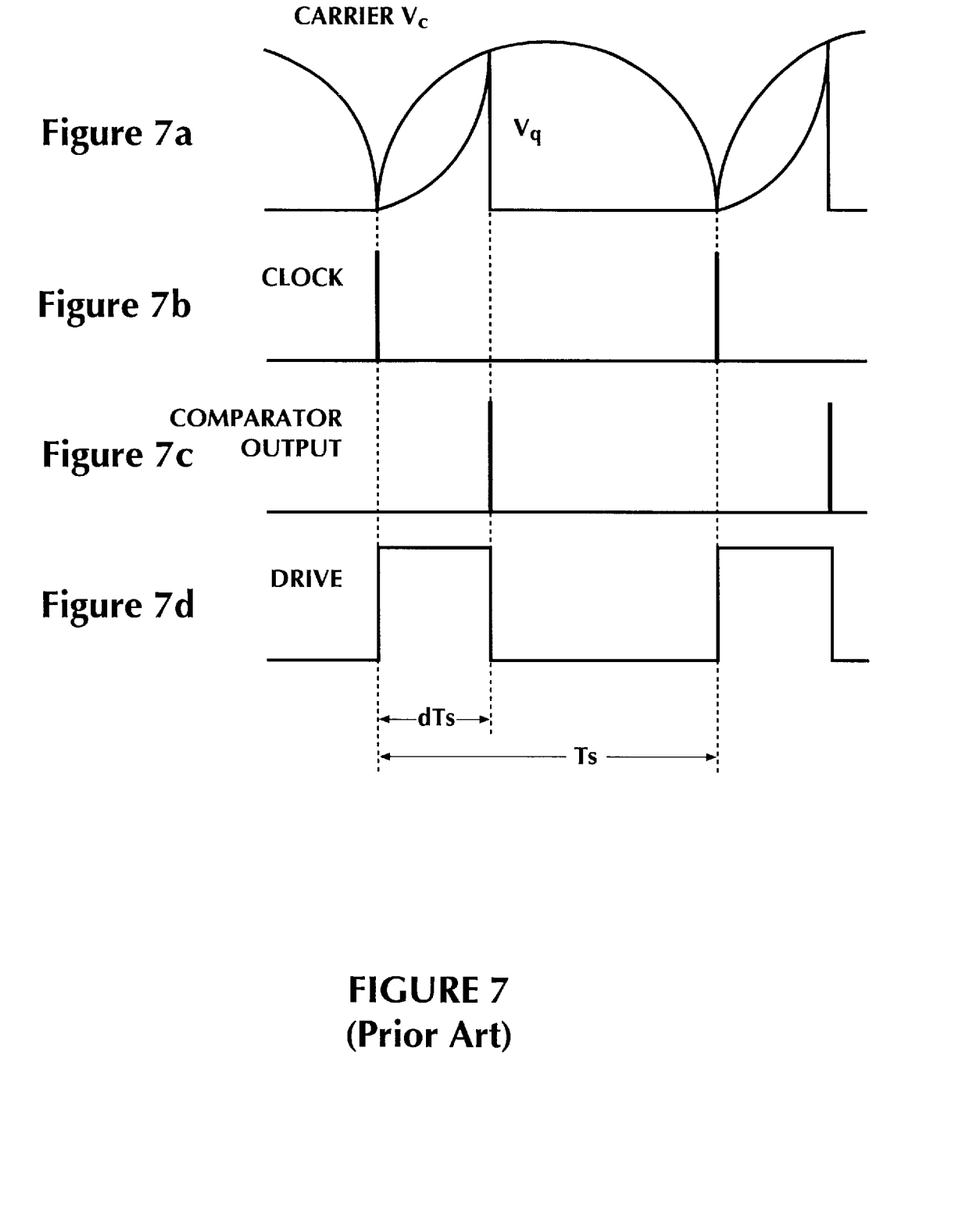
FIG. 7a illustrates a timing diagram of two signals Vq and Vc which are input to and compared by the comparator 68 of the power factor controller circuit of FIG. 6.
FIG. 7b illustrates a timing diagram of the clock signal output by the oscillating circuit 72 of the power factor controller circuit of FIG. 6.
FIG. 7c illustrates a timing diagram of the output of the comparator 68 of the power factor controller circuit of FIG. 6.
FIG. 7d illustrates a timing diagram of the output of the gate driver circuit 82 of the power factor controller circuit of FIG. 6.

Timing diagrams of relevant signals within the nonlinear carrier controller taught by Maksimovic et al. are illustrated in FIG. 7. The two signals Vq and Vc which are input to the comparator 68 are illustrated in FIG. 7a. The clock signal output by the oscillating circuit 72 is illustrated in FIG. 7b. The pulses illustrated in FIG. 7b represent the trailing edge of the clock signal. The output of the comparator 68 is illustrated in FIG. 7c. The output of the gate driver circuit 82 is illustrated in FIG. 7d. The output of the gate driver circuit 82 represents the duty cycle of the switch SW1.

At the trailing edge of the clock signal, as illustrated in FIG. 7b, the carrier waveform Vc is reset and the output Q of the flip-flop 70 is set, thereby raising the output of the gate driver circuit 82 to a logical high voltage level and closing or turning on the switch SW1. The integrated signal Vq, representing the current flowing through the switch SW1, rises when the switch SW1 is closed. When the value of the signal Vq is greater than the value of the carrier waveform Vc, the output of the comparator 68 will rise to a logical high voltage level, causing the output of the flip-flop 70 to fall to a logical low voltage level. When the output Q of the flip-flop 70 falls to a logical low voltage level, the output of the gate driver circuit 82 is pulled to a logical low voltage level and the switch SW1 is open or turned off. The duty cycle of the switch SW1 is therefore set between the trailing edge of the clock signal and the time when the integrated signal Vq rises above the carrier waveform Vc. The difference between the value of the output voltage Vo and the value of the reference voltage Vref influences the characteristics of the carrier waveform Vc. Accordingly, pulse width modulation is used to vary the duty cycle of the switch SW1 in order to achieve the desired output voltage Vo.

The nonlinear carrier controller taught by Maksimovic et al. provides a simpler implementation for a power factor correction circuit than the circuits of the prior art. However, the technique and circuit taught by Maksimovic et al. is suitable only for boost converters operating in the continuous conduction mode. Further, Maksimovic et al. only considered trailing-edge modulation. What is needed is a power factor correction circuit which provides an even simpler implementation and which can also utilize leading edge modulation.

SUMMARY OF THE INVENTION

A nonlinear carrier controlled power factor correction circuit provides unity power factor at the input of a power supply by only sensing the output voltage and the current flowing through a diode of a rectifier circuit. The power factor correction circuit monitors a level of current flowing through the diode and generates an integrated voltage signal representative of the level of current flowing through the diode. The integrated voltage signal is compared to a periodic, carrier waveform signal generated using a feedback signal corresponding to a level of an output voltage delivered to a load. A difference between the feedback signal and a reference signal determines the waveshape and characteristics of the carrier waveform. Preferably, leading edge modulation is used to control the duty cycle of a switch within the rectifier circuit. The switch is turned on when the integrated voltage signal reaches a level greater than the value of the carrier waveform. The switch is turned off at the leading edge of the clock reference signal. The duty cycle of the switch will vary as the level of the output voltage varies in reference to the reference signal and as the level of current through the diode varies.

DETAILED DESCRIPTION OF THE PREFERRED EMBODIMENT

A nonlinear carrier controlled power factor correction circuit according to the present invention provides unity power factor at the input of a power supply by only sensing the output voltage and the current flowing through a diode within a rectifier circuit. The power factor correction circuit monitors a level of current flowing through the diode, generates an integrated voltage signal representative of the level of current flowing through the diode and compares the integrated voltage signal to a periodic carrier waveform. The carrier waveform is generated using a feedback signal corresponding to a level of the output signal. The difference between the feedback signal and a reference signal influences the characteristics of the carrier waveform. The carrier signal is periodic with a period equal to the switching period, and its waveshape is determined so that the resulting input line current is proportional to the input line voltage. In the preferred embodiment of the present invention, leading edge modulation is used to control the duty cycle of a switch within the rectifier circuit. The switch is turned on when the output of the integrator rises to a value which is greater than the value of the carrier waveform. The switch is turned off at the leading edge of the clock reference signal.

Figure 8:
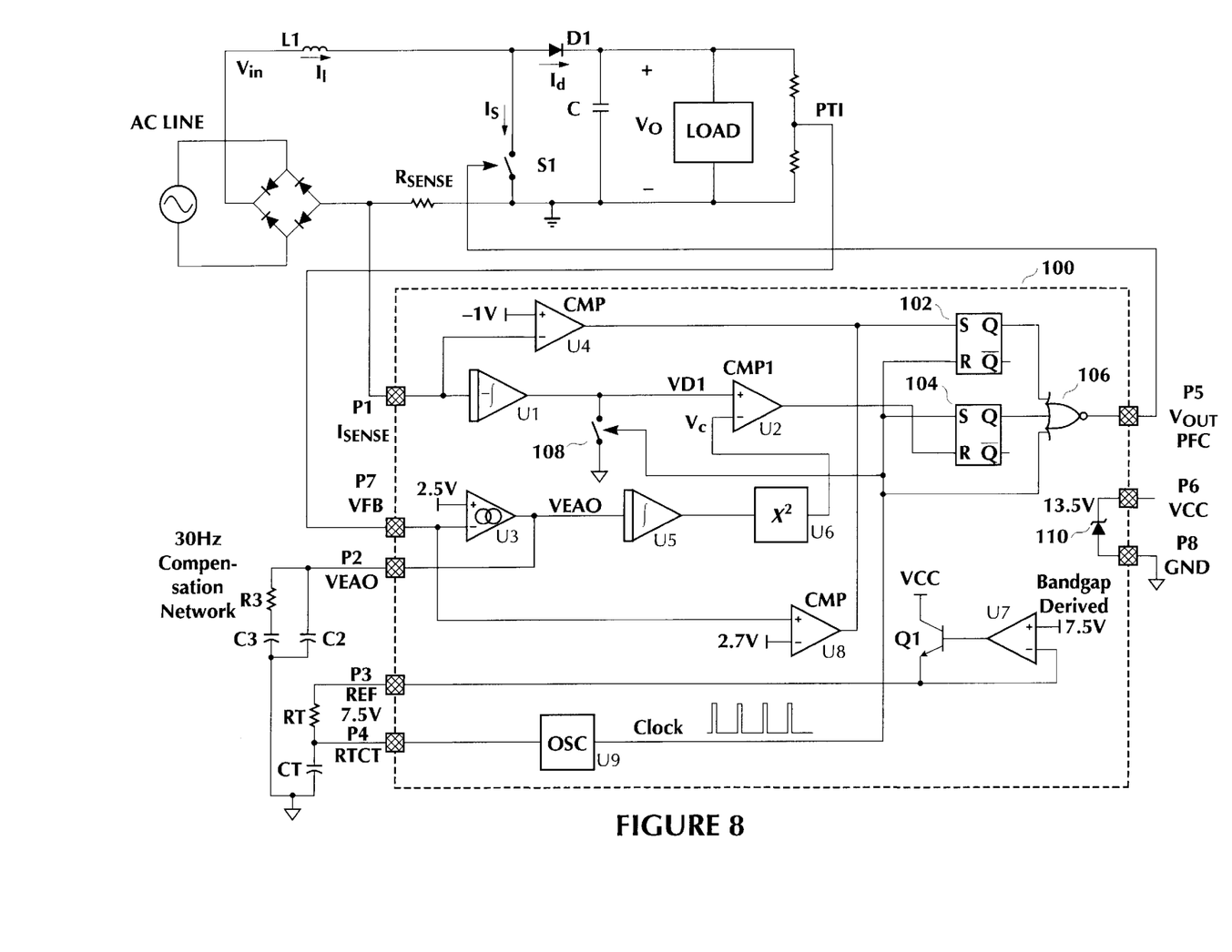
FIG. 8 illustrates a block diagram schematic of a boost converter configured as a leading edge power factor correction circuit of the present invention.

A boost converter configured as a leading edge power factor correction circuit according to the present invention is illustrated in FIG. 8. In each cycle, the current flowing through the diode D1 is represented by the following equation:

$$Id = \frac{1}{Ts} \int_{TsD}^{Ts} Id(t)dt \qquad (10)$$

If the equations (1) and (3) from above are combined, the current Id can also be calculated as shown in the following equations:

$$Id = \frac{Vin\, Il}{Vo} \qquad (11)$$

$$Id = \frac{Vin}{Vo} \left(\frac{Vin}{Re}\right) \qquad (12)$$

$$Id = \frac{Vin^2}{Vo\, Re} \qquad (13)$$

$$Id = \frac{Vo(1-D)^2}{Re} \; ; \text{If } Vin = Vo(1-D) \qquad (14)$$

$$Id = \frac{Vo}{Re}(1-D)^2 \qquad (15)$$

$$Id = \frac{Vo}{Re}(D')^2 \qquad (16)$$

The period D' represents the portion of each period of the clock cycle when the switch S1 is open or off (i.e. D'=1−D). By comparing the values derived using the equations (10) and (16), pulse width modulation can be used to control the switch S1. As the expected value of the voltage Vo supplied to the load differs from a reference voltage, the shape and height of the carrier waveform is adjusted, moving the trip point at which time the output of the integrator reaches a value above the value of the carrier waveform and turns the switch S1 on. Accordingly, the cycle-by-cycle average of the current flowing through the diode is compared to the periodic carrier waveform, forcing the input current in the rectifier circuit to automatically follow the input line voltage.

Within the preferred embodiment of the power factor correction circuit of the present invention, as illustrated in FIG. 8, a first terminal of an inductor L1 is coupled to receive an input voltage Vin. A second terminal of the inductor L1 is coupled to a first terminal of a switch S1 and to an anode of a diode D1. A cathode of the diode D1 is coupled to a first terminal of a capacitor C. A second terminal of the capacitor C is coupled to a second terminal of the switch S1, to a first terminal of a sense resistor RSENSE and to ground. A load is coupled across the capacitor C. A potentiometer PT1 is also coupled across the capacitor C.

A second terminal of the sense resistor RSENSE is coupled to an input of an integrator circuit U1 and to a negative input of a comparator U4. A reference voltage having a value of −1 volts is coupled to a positive input of the comparator U4. An output of the comparator U4 is coupled to an input S of a flip-flop 102. An output VD1 of the integrator circuit U1 is coupled to a first terminal of a reset switch 108 and to a positive input of a comparator U2. A second terminal of the reset switch 108 is coupled to ground.

An output VFB of the potentiometer PT1 is coupled to a negative input of an error amplifier U3 and to a positive input of a comparator U8. A reference voltage having a value of 2.5 volts is coupled to a positive input of the amplifier U3. An output VEAO of the amplifier U3 is coupled to an input of an integrator circuit U5, to a first terminal of a resistor R3 and to a first terminal of a capacitor C2. A second terminal of the resistor R3 is coupled to a first terminal of a capacitor C3. A second terminal of the capacitor C2 is coupled to a second terminal of the capacitor C3 and to ground. Together, the resistor R3 and the capacitors C2 and C3 form a 30 Hz compensation network.

A reference voltage having a value of 2.7 volts is coupled to a negative input of the comparator U8. An output of the comparator U8 is coupled to the output of the comparator U4 and to a set input S of the flip-flop 102. An output of the integrator circuit U5 is coupled as an input to a squaring circuit U6 and to a first terminal of a reset switch 112. A second terminal of the reset switch 112 is coupled to the ground node. An output Vc of the squaring circuit U6 is coupled to a negative input of the comparator U2. Together, the integrator circuit U5 and the squaring circuit U6 generate the carrier waveform Vc in response to the level of the output VEAO of the error amplifier U3. An output of the comparator U2 is coupled to a reset input R of a flip-flop 104.

A reference voltage having a value of 7.5 volts is coupled to a positive input of an amplifier U7. An output of the amplifier U7 is coupled to a base of an npn transistor Q1. A collector of the transistor Q1 is coupled to a positive supply voltage VCC. An emitter of the transistor Q1 is coupled to a first terminal of a resistor RT and to a negative input of the amplifier U7. A second terminal of the resistor RT is coupled to a first terminal of a capacitor CT and to an input of an oscillating circuit U9. A second terminal of the capacitor CT is coupled to ground. Together, the resistor RT and the capacitor CT form an RC network which provides a reference signal by which the oscillator circuit U9 generates an oscillating clock reference signal having a period relative to the value of the signal input from the RC network formed by the resistor RT and the capacitor CT.

An output, providing the clock reference signal Clock, of the oscillating circuit U9 is coupled to a reset input R of the flip-flop 102, to a set input S of the flip-flop 104, to control the reset switches 108, 112 and as an input to a logical NOR gate 106. An output Q of the flip-flop 102 is coupled as an input to the logical NOR gate 106. An output Q of the flip-flop 104 is coupled as an input to the logical NOR gate 106. An output of the logical NOR gate 106 is coupled to control the operation of the switch S1.

The positive supply voltage VCC is coupled to a cathode of a diode 110. An anode of the diode 110 is coupled to ground. The diode 110 maintains the necessary voltage difference between the positive supply voltage VCC and ground. In the preferred embodiment of the present invention the voltage difference between the positive supply voltage VCC and ground is equal to 13.5 volts.

The preferred embodiment of the nonlinear carrier controlled power factor correction circuit 110 of the present invention is embodied within an eight-pin integrated circuit as illustrated in FIG. 8. Within the integrated circuit, the pin P1 is coupled to the input of the integrator circuit U1. The pin P1 is also configured for coupling to the second terminal of the sense resistor RSENSE. Within the integrated circuit, the pin P7 is coupled to the negative input of the error amplifier U3 and the positive input of the comparator U8. The pin P7 is also configured for coupling to the output of the potentiometer PT1 to receive the feedback signal VFB. Within the integrated circuit, the pin P2 is coupled to the output of the error amplifier U3 and the input of the integrator circuit U5. The pin P2 is also configured for coupling to the 30 Hz compensation network including the resistor R3 and the capacitors C2 and C3. Within the integrated circuit, the pin P3 is coupled to the emitter of the transistor Q1 and to the negative input of the amplifier U7. The pin P3 is also configured for coupling to the first terminal of the resistor RT of the RC network. Within the integrated circuit, the pin P4 is coupled to the input of the oscillator U9. The pin P4 is also configured for coupling to the second terminal of the resistor RT and to the first terminal of the capacitor CT. Within the integrated circuit, the pin P8 is coupled to the anode of the diode 110. The pin P8 is also configured for coupling to ground. Within the integrated circuit, the pin P6 is coupled to the cathode of the diode 110. The pin P6 is also configured for coupling to the positive supply voltage VCC. Within the integrated circuit, the pin P5 is coupled to the output of the logical NOR gate 106. The pin P5 is also configured for coupling to control the switch S1.

Using the above relationships, the circuit 100 of the present invention, compares the integrated signal VD1 with the periodic carrier waveform Vc to control the duty cycle of the switch SI and ensure that the rectifier input current follows the input line voltage. The integrated signal VD1 is generated by the integrator circuit U1 and represents the current flowing through the diode D1. As will be apparent to those skilled in the art, when the switch S1 is open, the current flowing through the sense resistor RSENSE will represent the current flowing through the diode D1. The carrier waveform Vc is generated by the circuits U3, U5 and U6 in response to the level of the feedback signal VFB from the potentiometer PT1. The slow-varying modulating input VFB, representing the output voltage Vo delivered to the load, is used to control the emulated resistance and the power level in the output voltage regulation loop without the need for a multiplier.

When the switch S1 is open or off, the integrated signal VD1 is rising. When the value of the signal VD1 rises above the value of the carrier waveform Vc the output of the comparator U2 rises to a logical high voltage level and the switch S1 is turned on or closed. The switch S1 is then turned off on the next leading edge of the clock signal generated by the oscillator circuit U9.

Figures 9, 9E:
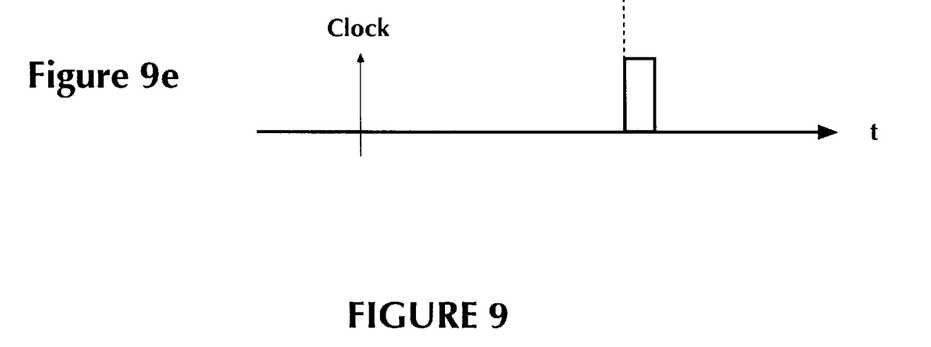
FIG. 9e illustrates a timing diagram of the clock reference signal Clock within the circuit of FIG. 8.
Figure 9A:
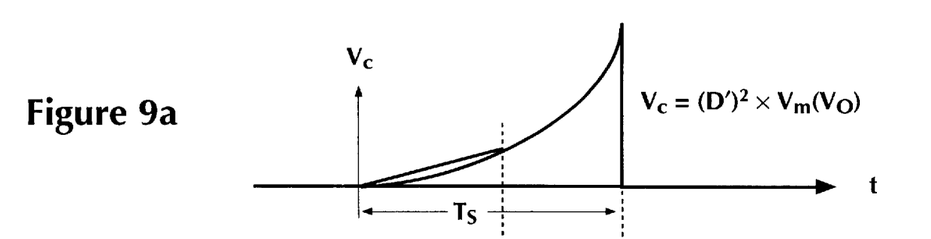
FIG. 9a illustrates a timing diagram of the carrier waveform Vc of the circuit of FIG. 8.
Figure 9B:
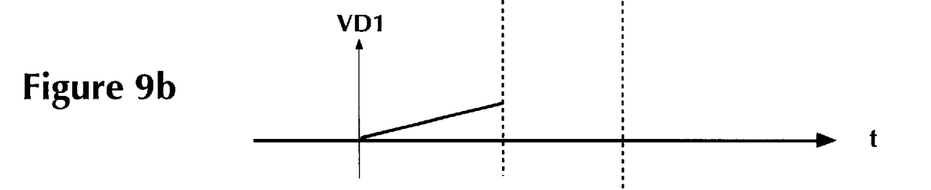
FIG. 9b illustrates a timing diagram of the signal VD1 representing the current through the diode D1 of the circuit of FIG. 8.
Figure 9C:
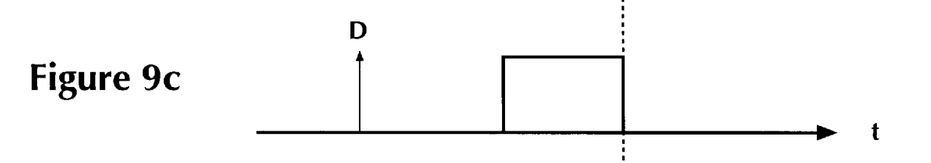
FIG. 9c illustrates a timing diagram of the duty cycle D of the switch S1 of the circuit of FIG. 8.
Figure 9D:
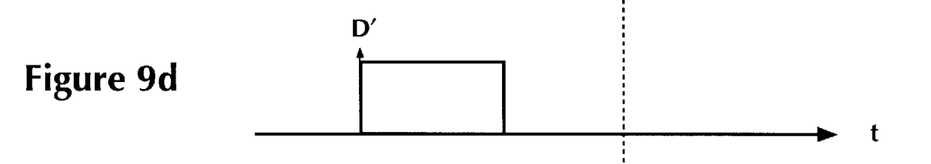
FIG. 9d illustrates a timing diagram of the time D' when the switch S1 is off within the circuit of FIG. 8.

Timing diagrams of relevant signals within the power factor correction circuit 100 of the present invention are illustrated in FIG. 9. A timing diagram of one period of the periodic carrier waveform Vc provided as the output of the squaring circuit U6 is illustrated in FIG. 9a. A timing diagram of the integrated signal VD1 generated by the integrator circuit U1 and representing the current through the diode D1 is illustrated in FIG. 9b. A timing diagram illustrating the duty cycle D or time during a period when the switch S1 is on, is shown in FIG. 9c. A timing diagram illustrating the time period D' or the time during a period when the switch S1 is off, is shown in FIG. 9d. A timing diagram of the clock reference signal Clock, provided as the output of the oscillating circuit U9, is illustrated in FIG. 9e.

During a period of the clock reference signal Clock, the carrier waveform Vc output from the squaring circuit U6 rises until it is reset at the leading edge of the clock reference signal Clock. At the beginning of the period of the clock reference signal Clock when the switch S1 is off or open, the output VD1 of the integrator circuit U1, representing the current Id through the diode D1, rises linearly. The switch S1 is turned on or closed when the output VD1 of the integrator circuit U1 rises above the value of the carrier waveform Vc. The switch S1 is then turned off at the leading edge of the clock reference signal Clock output by the oscillator circuit U9.

A voltage signal, representing the level of current flowing through the sense resistor RSENSE, is input to the integrator circuit U1. Because the current flows from ground through the sense resistor RSENSE, the value of the voltage signal input to the integrator circuit U1 will be negative. The integrator circuit U1 provides a positive output integrated signal VD1 which represents the level of the current flowing through the sense resistor RSENSE. The reset switch 108 is on or closed during each pulse of the clock reference signal output from the oscillator U9, to reset the integrated signal VD1 to zero to ensure the correct zero initial conditions. The output VD1 of the integrator U1 is therefore pulled to a ground level during each clock pulse when the switch 108 is closed.

The voltage signal representing the level of current flowing through the sense resistor RSENSE, which is input to the integrator circuit U1 is also input to the comparator U4. If the value of this voltage signal falls below a level equal to −1 volts, then the output of the comparator U4 will rise to a logical high voltage level. When the output of the comparator U4 rises to a logical high voltage level, the output Q of the flip-flop 102 will rise to a logical high voltage level, causing the output of the logical NOR gate 106 to fall to a logical low voltage level and the switch S1 to be turned off.

A voltage signal VFB, representing the output of the potentiometer PT1 is input to the error amplifier U3. The error amplifier U3 amplifies the difference between the value of the voltage signal VFB and the reference voltage having a value equal to 2.5 volts to obtain the output VEAO. The output VEAO of the error amplifier will change as the level of the voltage signal VFB varies. The integrator U5 and the squaring circuit U6 transform the modulating input VEAO from the error amplifier U3 into the carrier waveform signal VC.

The voltage signal VFB is also input to the comparator U8 and compared to the reference voltage having a value equal to 2.7 volts. If the value of the voltage VFB rises above a level equal to 2.7 volts, then the output of the comparator U8 will rise to a logical high voltage level. When the output of the comparator U8 rises to a logical high voltage level, the output Q of the flip-flop 102 will rise to a logical high voltage level, causing the output of the logical NOR gate 106 to fall to a logical low voltage level and the switch S1 to be turned off.

At the leading edge of the clock reference signal Clock, the output of the logical NOR gate 106 falls to a logical low voltage level thereby turning off or opening the switch S1. The carrier waveform Vc, generated by the integrator U5 and the squaring circuit U6, then increases as illustrated in FIG. 9a. The integrated signal VD1 from the integrator circuit U1 also increases as illustrated in FIG. 9b. When the integrated signal VD1 rises above the carrier waveform Vc, the output of the comparator U2 rises to a logical high voltage level causing the output Q of the flip-flop 104 to fall to a logical low voltage level. Because all of the inputs to the logical NOR gate 106 are at a logical low voltage level, the output of the logical NOR gate 106 will rise to a logical high voltage level thereby turning on or closing the switch S1.

The switch S1 stays on or closed until the leading edge of the next pulse of the clock reference signal Clock. On the leading edge of the next pulse of the clock reference signal Clock, the output Q of the flip-flop 102 is reset to a logical low voltage level, the output Q of the flip-flop 104 is set to a logical high voltage level, the output of the logical NOR gate 106 is pulled to a logical low voltage level, the switch S1 is opened or turned off and the switch 108 is closed or turned on. The duty cycle D of the switch S1 is therefore set between the time the integrated signal VD1 rises above the carrier waveform Vc and the leading edge of the clock reference signal Clock.

The circuit of the present invention operates in both the continuous and discontinuous conduction modes. The circuit of the present invention, as illustrated in FIG. 8 is also easier to implement than power factor correction circuits of the prior art. Instead of a complicated carrier waveform generator circuit, the circuit of the present invention requires only the integrator circuit U5 and the squaring circuit U6 to generate the carrier waveform Vc. The nonlinear carrier controlled power factor correction circuit of the present invention does not require sensing of the input current and voltage. The nonlinear carrier controlled power factor correction circuit of the present invention also does not require a multiplier within the voltage-control loop.

While the preferred embodiment of the present invention is designed to operate with a boost converter, the power factor controller of the present invention can also be adapted to work with other types of converter configurations by changing the relationships which are compared and used to control the duty cycle of the switch S1. Specifically, for a buck converter, using trailing edge modulation the level of current flowing through the switch can be integrated and compared to a carrier waveform generated using the following relationship:

$$Is = \frac{Vo}{D\,Re} \tag{17}$$

For a buck converter, using leading edge modulation the level of current through diode can be integrated and compared to a carrier waveform generated using the following relationship:

$$Id = \frac{Vo}{Re}\left(\frac{D'}{(1-D')^2}\right) \tag{18}$$

For a flyback converter, using trailing edge modulation the level of current through the switch can be integrated and compared to a carrier waveform generated using the following relationship:

$$Is = \frac{Vo}{Re}\left(\frac{1-D}{D}\right) \tag{19}$$

For a flyback converter, using leading edge modulation the level of current through the diode can be integrated and compared to a carrier waveform generated using the following relationship:

$$Id = \frac{Vo}{Re}\left(\frac{D'}{1-D'}\right)^2 \tag{20}$$

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. A power factor correction circuit using input current modulation for controlling a switch in a rectifier circuit, wherein the rectifier circuit includes the switch and a diode and is configured for coupling to a load, comprising:
   a. first means for generating an integrated signal representative of a level of current flowing through the diode configured for receiving a signal representative of the level of current flowing through the diode;
   b. second means for generating a carrier waveform signal representative of a difference between a level of voltage supplied to the load and a reference voltage configured for coupling to the load;

c. means for comparing the integrated signal to the carrier waveform signal and generating an output signal coupled to receive the integrated signal and the carrier waveform signal for generating an output signal in response to a comparison; and d. means for controlling coupled to the means for comparing and configured for coupling to the switch for controlling the operation of the switch in response to the output signal.

2. The power factor correction circuit as claimed in claim 1 further comprising an oscillating circuit coupled to the means for controlling for generating a clock reference signal.

3. The power factor correction circuit as claimed in claim 2 wherein leading edge modulation is used by the means for controlling to control the switch.

4. The power factor correction circuit as claimed in claim 3 wherein the means for controlling closes the switch when the integrated signal is greater than the carrier waveform signal and opens the switch at a leading edge of the clock reference signal.

5. The power factor correction circuit as claimed in claim 4 further comprising current sensing means coupled to the rectifier circuit and to the first means for generating for measuring the level of current flowing through the diode.

6. The power factor correction circuit as claimed in claim 5 wherein the current sensing means includes a sense resistor.

7. The power factor correction circuit as claimed in claim 6 wherein the first means for generating includes an integrating circuit with a reset switch.

8. The power factor correction circuit as claimed in claim 7 wherein the second means for generating includes an error amplifier.

9. The power factor correction circuit as claimed in claim 8 wherein the rectifier circuit is a boost configuration.

10. The power factor correction circuit as claimed in claim 8 wherein the rectifier circuit is a buck configuration.

11. The power factor correction circuit as claimed in claim 8 wherein the rectifier circuit is a flyback configuration.

12. A power factor correction circuit using input current modulation for controlling a switch in a rectifier circuit, wherein the rectifier circuit includes the switch and a diode and is configured for coupling to a load, comprising:

a. means for monitoring a level of current flowing through the diode;

b. first means for generating coupled to the means for monitoring for generating an integrated signal representative of the level of current flowing through the diode;

c. second means for generating configured for coupling to the load for generating a carrier waveform signal representative of a difference between a level of voltage supplied to the load and a reference voltage;

d. means for comparing coupled to the first and second means for generating for comparing the integrated signal to the carrier waveform signal and generating an output signal; and e. means for controlling the switch configured for coupling to the switch and coupled to the means for comparing for controlling operation of the switch in response to the output signal.

13. The power factor correction circuit as claimed in claim 12 further comprising an oscillating circuit coupled to the means for controlling for generating a clock reference signal of a predetermined period having a leading edge and a trailing edge.

14. The power factor correction circuit as claimed in claim 13 wherein leading edge modulation is used by the means for controlling to control the switch.

15. The power factor correction circuit as claimed in claim 14 wherein the means for controlling closes the switch when a value of the integrated signal is greater than a value of the carrier waveform signal and opens the switch on the leading edge of the clock reference signal.

16. The power factor correction circuit as claimed in claim 15 wherein the means for monitoring includes a sense resistor.

17. A method of controlling a switch in a rectifier circuit, wherein the rectifier circuit includes the switch and a diode and is configured for coupling to a load, comprising the steps of:

a. generating an integrated signal representative of a level of current flowing through the diode;

b. generating a carrier waveform signal representative of a difference between a level of voltage supplied to the load and a reference voltage;

c. generating an output signal representative of relative levels of the integrated signal and the carrier waveform signal, wherein the output signal is at a logical low voltage level when a value of the integrated signal is less than a value of the carrier waveform and the output signal is at a logical high voltage level when the value of the integrated signal is greater than the value of the carrier waveform; and d. generating a control signal for controlling the switch wherein the control signal turns the switch on when the output signal is at a logical high voltage level.

18. The method as claimed in claim 17 further comprising the step of generating a clock reference signal.

19. The method as claimed in claim 18 wherein the control signal turns the switch off when the clock reference signal rises to a logical high voltage level.

20. A rectifier and power factor correction circuit for supplying power to a load from an input voltage source comprising:

a. a storage device for storing voltage drawn from the input source and supplying a supplied amount of voltage to a load device;

b. a switching circuit coupled between the storage device and the input source, having an on configuration and an off configuration, wherein voltage is only drawn from the input source when the switching circuit is in the on configuration;

c. a diode coupled between the storage device and the switching circuit;

d. a monitoring circuit coupled to the diode for monitoring a level of current through the diode;

e. an integrating circuit coupled to the monitoring circuit for generating an integrated signal representative of the level of current flowing through the diode;

f. a generating circuit configured for coupling to the load for generating a carrier waveform signal representative of a difference between a level of voltage supplied to the load and a reference voltage;

g. a comparing circuit coupled to the integrating circuit and to the generating circuit for comparing the integrated signal to the carrier waveform signal and generating a control signal; and h. a controlling circuit coupled to the switching circuit and to the comparing circuit for controlling operation of the switching circuit in response to the control signal.

21. The power factor correction circuit as claimed in claim 20 further comprising an oscillating circuit coupled to the means for controlling for generating a clock reference signal of a predetermined period having a leading edge and a trailing edge.

22. The power factor correction circuit as claimed in claim 21 wherein the control signal is at a logical low voltage level when a value of the integrated signal is less than a value of the carrier waveform signal and at a logical high voltage level when the value of the integrated signal is greater than the value of the carrier waveform signal.

23. The power factor correction circuit as claimed in claim 22 wherein the controlling circuit closes the switch when the control signal is at a logical high voltage level and opens the switch on the leading edge of the clock reference signal.

24. A power factor correction circuit comprising:
   a. means for sensing an input current for forming a current sense signal;
   b. first means for integrating the current sense signal over a period of a clock signal for forming a first integrated signal, the first means for integrating coupled to the means for sensing;
   c. first means for comparing an output voltage to a desired output voltage for forming an error signal;
   d. second means for integrating the error signal over the period of the clock signal for forming a second integrated signal, the second means for integrating coupled to the first means for comparing;
   e. means for squaring the second integrated signal for forming a squared signal, the means for squaring coupled to second means for integrating; and
   f. second means for comparing the squared signal to the first integrated signal for forming a control signal; and
   g. means for modulating the input current coupled to receive the control signal.

25. The power factor correction circuit according to claim 24 wherein the clock signal is periodic and each period has a leading edge and a trailing edge and wherein the means for modulating modulates the input current according to the leading edge.

26. The power factor correction circuit according to claim 25 wherein the means for modulating closes a switch through which the input current flows when a value of the integrated signal is greater than a value of the squared signal and opens the switch upon the leading edge.

* * * * *